(12) United States Patent
Edwards, Sr.

(10) Patent No.: US 8,171,201 B1
(45) Date of Patent: May 1, 2012

(54) SYSTEMS AND METHODS FOR IMPROVING VIRTUAL MACHINE PERFORMANCE

(75) Inventor: Thomas Scott Edwards, Sr., Duluth, GA (US)

(73) Assignee: Vizioncore, Inc., Buffalo Grove, IL (US)

( * ) Notice: Subject to any disclaimer, the term of this patent is extended or adjusted under 35 U.S.C. 154(b) by 336 days.

(21) Appl. No.: 12/575,342

(22) Filed: Oct. 7, 2009

Related U.S. Application Data

(60) Provisional application No. 61/103,367, filed on Oct. 7, 2008.

(51) Int. Cl.
*G06F 12/00* (2006.01)

(52) U.S. Cl. ............ 711/6; 711/112; 711/165; 711/170; 711/173

(58) Field of Classification Search .............. 711/6, 112, 711/165, 170, 173
See application file for complete search history.

(56) References Cited

U.S. PATENT DOCUMENTS

| | | | | |
|---|---|---|---|---|
| 6,178,487 | B1 * | 1/2001 | Ruff et al. | 711/165 |
| 6,718,436 | B2 * | 4/2004 | Kim et al. | 711/114 |
| 7,856,439 | B2 * | 12/2010 | Alpern et al. | 707/756 |
| 7,996,414 | B2 * | 8/2011 | Alpern et al. | 707/758 |
| 2002/0157010 | A1 * | 10/2002 | Dayan et al. | 713/191 |
| 2003/0023811 | A1 * | 1/2003 | Kim et al. | 711/114 |
| 2004/0117414 | A1 * | 6/2004 | Braun et al. | 707/204 |

OTHER PUBLICATIONS

Harley Stagner, "Aligning disk partitions to boost virtual machine performance", VMware Management, Migration and Performance, http://searchvmware.techtarget.com/tip/0,289483, sid179_gci1344730_mem1,00.html, Jan. 28, 2009, pp. 1-5.

Jeff Graves, "Partition Alignment", ORCS Web Team Blog, http://www.orcsweb.com/blog, Sep. 14, 2009, pp. 1-2.

John Willemse, "VMware disk alignment VMDK settings and align at the 64k boundary", PLANET LOTUS, http://planetlotus.org/profiles/john-willemse_49586, Apr. 30, 2009, in 5 pages.

Tom Hirt, "Importance of Disk Alignment in VMware", VMware Disk Alignment—How-to Align VMware Partitions—Disk, Alignment, Vmfs, Vmdk, Esx, Apr. 9, 2009, pp. 1-15.

VMware, Inc., "Recommendations for Aligning VMFS Partitions", VMware Infrastructure 3, VMware Performance Study, 2009, pp. 1-10.

VMware, Inc., "VMware Virtual Machine File System: Technical Overview and Best Practices", A VMware Technical White Paper, Paper Number: WP-022-PRD-01-01, Version 1.0, 2007, pp. 1-19.

Acronis, Inc., "Acronis Disk Director 11 Advanced Workstation User's Guide", 2000, in 92 pages.

* cited by examiner

*Primary Examiner* — Kevin Ellis
*Assistant Examiner* — Mehdi Namazi
(74) *Attorney, Agent, or Firm* — Knobbe, Martens, Olson & Bear, LLP

(57) ABSTRACT

Virtual machine optimization and/or storage reclamation solutions are disclosed that manage virtual machine sprawl and/or growing enterprise storage costs. For instance, certain solutions receive recommendations based on one or more rules, policies and/or user preferences that identify storage and/or alignment criteria for virtual machine disk (VMDK) partition(s). In certain examples, a resize tool that operates within a host operating system of a host server dynamically resizes and/or aligns one or more VMDK partitions of a powered-down virtual machine. For instance, the resize tool can be injected to the host server from a remote management server and can resize and/or align the VMDK partitions without requiring contents of the VMDK to be copied to another VMDK. By reallocating storage and/or aligning the VMDK partitions, embodiments of the invention can increase virtual machine performance and improve storage management.

18 Claims, 11 Drawing Sheets

Space and Alignment Detailed Report

ESX Server: 12.3.4.567

For 12.3.4.567, vOptimizer found a total of 15 Windows-based VM(s).
For the 15 VM(s) found:
Powered on: 12

836.5 GB of Total space on ESX Server
800.96 GB of Used space on ESX Server
438.11 GB of Total space on logical disks of powered on virtual machines
366.66 GB of Free space on logical disks of powered on virtual machines Powered on VMs detailed information:

| VM name | Disk | Total Space, GB | Used Space, GB | Free Space, GB | Free, % | Alignment status |
|---|---|---|---|---|---|---|
| JR_Optimize | C: | 3.10 | 2.12 | 0.96 | 31 | Not scanned |
| SP-vFog526 | C: | 19.99 | 2.63 | 17.35 | 87 | Not scanned |
| vc-vm-bcarstens | C: | 49.99 | 5.43 | 44.56 | 89 | Not scanned |
| vc-vm-jChristensen | C: | 5.76 | 5.03 | 0.74 | 13 | Not scanned |
| vc-vm-jmattox | C: | 49.99 | 11.66 | 38.34 | 77 | Not scanned |
| vc-vm-marnold | C: | 49.99 | 4.98 | 45.01 | 90 | Not scanned |
| vc-vm-mdelplato | C: | 49.99 | 5.38 | 44.61 | 89 | Not scanned |

Datastores detailed information:

| Datastore | Total Space, GB | Used Space, GB | Free Space, GB |
|---|---|---|---|
| storage1 (3) | 535.75 | 505.37 | 31.35 |
| iSCS1bb2 | 299.75 | 295.59 | 4.16 |

Using a NN% free space rule (quota) on all powered on virtual machines you could reclaim space and save money:

| Quota, % | 20 | 35 | 40 | 80 |
|---|---|---|---|---|
| Reclaimed Space, GB | 77.67 | 72.51 | 70.23 | 19.71 |
| Saved Money, $ | 116.50 | 108.77 | 105.34 | 16.07 |

Print   View   Close

FIG. 7

SYSTEMS AND METHODS FOR IMPROVING VIRTUAL MACHINE PERFORMANCE

RELATED APPLICATION

This application claims the benefit of priority under 35 U.S.C. §119(e) of U.S. Provisional Patent Application No. 61/103,367, filed on Oct. 7, 2008, and entitled "Systems and Methods for Storage Reclamation in a Virtualized Computing Environment," the entirety of which is hereby incorporated herein by reference to be considered part of this specification.

BACKGROUND

1. Field of the Invention

Embodiments of the invention generally relate to systems and methods for performing virtual machine optimization and/or storage reclamation in a virtual computing environment.

2. Description of the Related Art

Many companies take advantage of virtualization solutions to consolidate several specialized physical servers and workstations into fewer servers running virtual machines. Each virtual machine can be configured with its own set of virtual hardware (e.g., processor, memory, ports and the like) such that specialized services that each of the previous physical machines performed can be run in their native operating system. In particular, a virtualization layer, or hypervisor, allocates the computing resources of one or more host servers to one or more virtual machines and further provides for isolation between such virtual machines. In such a manner, the virtual machine is a representation of a physical machine by software.

With the increasing popularity of virtual computing infrastructures has also come a demand for additional storage. However, oftentimes a large amount of wasted space exists in such infrastructures due to the over-allocation of the static hard drive size when new hosted virtual machines are created. Such over-allocation, especially when combined with the increasing problem of virtual machine sprawl, can lead to terabytes of wasted storage space, resulting in thousands of wasted information technology dollars.

Moreover, many virtual storage volumes are created in such a way that causes partitions of the virtual machine disks (VMDKs) to be misaligned. Such misalignment can cause data to be written to multiple blocks during a single write operation, which results in additional I/O and a further reduction of application and/or system performance.

SUMMARY

In view of the foregoing, a need exists for a virtual machine optimization and storage reclamation solution that helps to manage virtual machine sprawl and growing enterprise storage costs. For example, there is a need for systems and methods that identify and/or reclaim over-allocated virtual machine storage. Moreover, a need exists for systems and methods that further dynamically align VMDK partitions to improve virtual machine performance without requiring new VMDKs to be created to perform the alignment and/or resizing.

To address the drawbacks discussed above, certain embodiments of the invention scan through host servers and/or individual virtual machines to identify and calculate over-allocated virtual machine storage. Next, embodiments of the invention automatically right-size (e.g., shrink) select VMDKs to reclaim over-allocated storage, enabling customers to use their existing storage more efficiently and cost-effectively. Moreover, certain embodiments can further locate and fix (e.g., enlarge) virtual machines that are running out of storage, thereby effectively preventing painful and costly virtual machine outages.

In yet further embodiments, solutions and tools disclosed herein can perform partition alignments for newly sized VMDKs. For example, certain systems and methods engage in the alignment of WINDOWS volumes using 64 kilobyte (KB) blocks, which are then aligned with the virtual machine file system boundaries for improved performance.

In certain embodiments, a method is disclosed for improving virtual machine performance within a computing environment. The method comprises, for each of a plurality of virtual machines executing on at least one host server, obtaining a lock on the virtual machine associated with a virtual machine disk having a plurality of partitions and determining a target size of one or more of the plurality of partitions of the virtual machine disk. The method further includes issuing a first instruction to power off the virtual machine and, while the virtual machine is powered off, performing at least one of resizing and aligning the one or more partitions without copying contents of the virtual machine disk to another virtual machine disk. The method also includes issuing a second instruction to power on the virtual machine and removing the lock from the virtual machine.

In certain embodiments, a system is disclosed for improving virtual machine performance within a computing environment. The system comprises a host server, a datastore and a management server. The host server includes a host operating system and a plurality of virtual machines each having a guest operating system. The datastore comprises a plurality of virtual machine disks associated with each of the plurality of virtual machines, wherein a first virtual machine disk of the plurality of virtual machine disks is associated with a first virtual machine of the plurality of virtual machines. The management server is in network communication with the host server and is configured to inject a resize module into the host operating system of the host server. In particular, the resize module is configured to: (i) determine a target size of one or more of a plurality of partitions of the first virtual machine disk; (ii) issue a first instruction to power off the first virtual machine; (iii) while the first virtual machine is powered off, perform at least one of resizing and aligning the one or more partitions without copying contents of the first virtual machine disk to another virtual machine disk; and (iv) issue a second instruction to power on the first virtual machine.

In certain embodiments, another system is disclosed for improving virtual machine performance within a computing environment. In particular, the system comprises means for obtaining a lock on a virtual machine associated with a virtual machine disk having a plurality of partitions and means for determining a target size of one or more of the plurality of partitions of the virtual machine disk. The system also includes means for powering off the virtual machine and means for automatically resizing and aligning the one or more partitions, while the virtual machine is powered off, without copying contents of the virtual machine disk to another virtual machine disk. The system further includes means for powering on the virtual machine following said performing and means for removing the lock from the virtual machine.

Embodiments of the invention disclosed herein can provide several advantages, such as, for example, one or more of the following: increasing storage utilization, improving overall virtual machine storage performance, increasing I/O throughput, reducing latency, substantially lowering storage acquisition costs, increasing the number of virtual machines per host server, combinations of the same or the like.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 7 illustrates an exemplary screen display of a space and alignment report, according to certain embodiments of the invention.

DETAILED DESCRIPTION OF THE PREFERRED EMBODIMENTS

Figure 1:
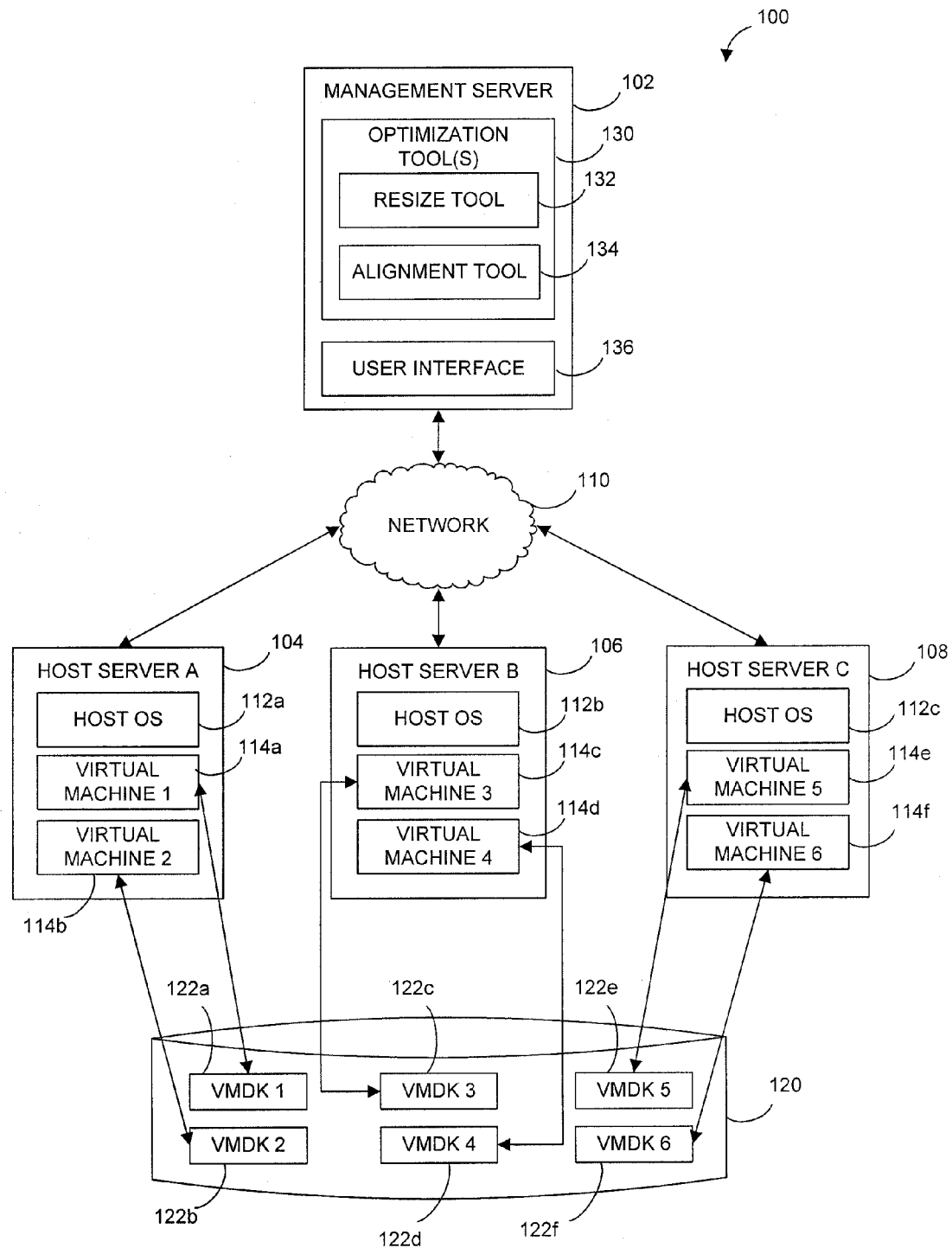
FIG. 1 illustrates a block diagram of a virtual computing system, according to certain embodiments of the invention.

Certain embodiments of the invention provide a virtual machine optimization and/or storage reclamation solution that manages virtual machine sprawl and/or growing enterprise storage costs. For instance, certain embodiments enable the reclamation of space taken on ESX datastores by automating the periodic resizing of new technology file system (NTFS) partitions for WINDOWS-based virtual machines. Embodiments of the invention can also reduce the footprint of WINDOWS-based virtual machines by enabling the periodic streamlining of the operating system via the deletion of selected files and disabling of unnecessary services.

Certain embodiments of the invention further perform a partition adjustment of an ESX-based virtual machine via an innovative process of mounting an offline virtual machine, inspection of the virtual machine's file system and guest operating system, followed by a (NTFS) resizing of the virtual machine's partition. For example, a virtual machine inspected to have a 10 GB partition of which 8 GB is unused space can be resized to 6 GB, leaving 4 GB free and 4 GB saved (e.g., available for other virtual machines).

Embodiments of the invention can also advantageously provide automatic processes that are driven by customizable profiles so that administrators can specify the amount of free space for certain categories of virtual machines (e.g., web servers require 50% free disk space, VDI knowledge workers require 35%, etc.). Storage savings can also be considerable (e.g., up to 40% of virtualization storage costs), thereby allowing administrators to take control of virtual machine sprawl and growing enterprise storage costs, including the improved efficiency and ability to contain more virtual machines on each ESX host.

Moreover, certain embodiments of the invention further provide for automatic alignment of partitions, or extents, of a VMDK file to increase I/O performance by the virtual machine. For example, such aligned partitions can ensure that a single I/O request is serviced by a single device.

The features of the inventive systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

The terms "optimize" and "optimization" as used herein are broad terms and are used in their ordinary sense and include, without limitation, the process of modifying a system and/or method to cause some aspect of the system or method to work more efficiently or to use fewer resources. For example, optimization of virtual storage reclamation can include one or more processes of modifying a virtual machine to allow a more efficient approach to allocating and using virtual machine storage. Thus, these terms are not used herein to imply that a maximum or best result is necessarily achieved or required.

The term "extent" as used herein is a broad term and is used in its ordinary sense and represents, without limitation, an area of a disk. For instance, an extent can comprise a continuous run of sectors on one disk or a contiguous area of storage in a computer file system, reserved for a file, folder, application or the like. A "system extent" can represent system areas of a disk (e.g., master boot record (MBR) or extended boot record (EBR) tables) that generally have a fixed size. A "partition," in certain embodiments, can refer to a type of extent representing a primary and/or a logical partition on disk.

For exemplary purposes, certain embodiments of the inventive systems and methods will be described herein with reference to hosted virtual infrastructures offered by VMware, Inc. (Palo Alto, Calif.). However, it will be understood from the disclosure herein that the disclosed systems and methods can be utilized with other virtualization technologies, including, but not limited to, virtual environments using XEN and XENSERVER by Citrix Systems, Inc. (Fort Lauderdale, Fla.), ORACLE virtual machine by Oracle Corporation (Redwood City, Calif.), HYPER-V by Microsoft Corporation (Redmond, Wash.), VIRTUOZZO by Parallels, Inc. (Switzerland), or the like.

FIG. 1 illustrates an exemplary block diagram of a virtual computing system 100, according to certain embodiments of the invention. In general, the virtual computing system 100 is advantageously configured to address issues of virtual machine sprawl and/or growing enterprise storage costs by providing for automatic storage reclamation and/or virtual machine optimization.

As shown, the virtual computing environment 100 comprises a management server 102 that communicates with a plurality of host servers 104, 106, 108 via a network 110. In certain embodiments, the management server 102 is configured to improve performance of the host servers 104, 106, 108 and/or the virtual machines hosted thereon by addressing virtual machine disk storage and/or partition alignment concerns. In certain embodiments, the management server 102 comprises a WINDOWS-based server, while in other embodiments the management server 102 can comprise a UNIX or LINUX server.

As illustrated, each of the host servers 104, 106, 108 comprises a host operating system and a plurality of virtual machines executing thereon. In particular, host server A 104 includes a host operating system 112a, a virtual machine 1 114a and a virtual machine 2 114b. Host server B 106 includes a host operating system 112b, a virtual machine 3 114c and a virtual machine 4 114d. Host server C 108 includes a host operating system 112c, a virtual machine 5 114e and a virtual machine 6 114f.

In certain embodiments, each of the host servers 104, 106, 108 comprises a hosted architecture having one or more computing devices configured to host each of its respective virtual machines above a hypervisor layer that runs directly on top of the hardware platform of the host server and virtualizes resources of the device(s) (e.g., a native or "bare-metal" hypervisor). Such abstraction by the hypervisor layer(s) allows, for example, for multiple virtual machines with heterogeneous operating systems and/or applications, such as WINDOWS or LINUX systems, mail servers or the like, to run in isolation on resources of the same physical machine(s). For instance, in certain embodiments, one or more of the host servers 104, 106, 108 comprises a VMWARE ESX server or other like virtualization platform.

Each of the host operating systems 112a-112c can provide a management layer for the respective host server. In certain embodiments, the host operating system has limited access to host system resources, such as processing time and memory, since such resources are generally allocated and reserved for use by the virtual machines and their respective hypervisors. For instance, certain host operating systems may be limited to accessing a single processor, even if the host server includes multiple processors, and approximately 100 MB of memory (e.g., RAM).

In yet other embodiments, one or more of the host servers 104, 106, 108 can include a hosted architecture in which the hypervisor runs within the host operating system. In such embodiments, the hypervisor can rely on the host operating system for device support and/or physical resource management. Examples of such hosted hypervisors can include, but are not limited to, VMWARE WORKSTATION and VMWARE SERVER by VMware, Inc., VIRTUAL SERVER by Microsoft Corporation, PARALLELS WORKSTATION by Parallels, Inc., or the like.

With continued reference to FIG. 1, each of the virtual machines 114a-114f is associated with a VMDK on a datastore 120. In certain embodiments, the VMDK can be considered a virtual hard drive of the associated virtual machine such that the virtual machine sees the VMDK as, for example, a local SCSI target. In certain embodiments, each of the VMDKs comprises one or more files stored on a virtual machine file system (VMFS) volume. When a virtual machine is operating, it obtains a lock on the VMDK files such that no other host servers can update them, thereby assuring that a single virtual machine cannot be opened at the same time by multiple host servers.

As illustrated, virtual machine 1 114a is associated with VMDK 1 122a; virtual machine 2 114b is associated with VMDK 2 122b; virtual machine 3 114c is associated with VMDK 3 122c; virtual machine 4 114d is associated with VMDK 4 122d; virtual machine 5 114e is associated with VMDK 5 122e; and virtual machine 6 114f is associated with VMDK 6 122f.

The datastore 120 can comprise any type of formatted logical container for holding virtual machine files and can exist on a physical storage resource, including one or more of the following: local disks (e.g., local small computer system interface (SCSI) disks of the host servers), a disk array, a storage area network (SAN) (e.g., fiber channel), an iSCSI disk area, network attached storage (NAS) arrays, network file system (NFS) or the like. In certain embodiments, the virtual machine(s) use the VMDKs on the datastore 120 to store their operating systems, program files and other like data.

The management server 102 further comprises one or more optimization tools 130 for improving performance of the host servers 104, 106, 108 and/or the virtual machines 114a-114f. For example, the illustrated management server 102 includes a resize tool 132 and an alignment tool 134.

In certain embodiments, and as discussed in more detail below, the resize tool 132 is configured to reclaim storage from virtual machines that have been allocated too much disk space for their current requirements and/or to re-allocate additional disk space to those virtual machines that may be running low on storage.

The alignment tool 134, in certain embodiments, is configured to automatically align VMDK partitions with associated VMFS partitions so as to improve system performance. In certain embodiments, and as discussed in more detail below, the alignment tool 134 is configured to re-align WINDOWS virtual machine volumes-using 64 KB blocks with the VMFS boundaries.

Although the resize tool 132 and alignment tool 134 have been illustrated and described as separate components, it will be understood that the two tools can be integrated or combined into a single module or tool. For instance, in certain embodiments, and as discussed in more detail below, alignment of partitions within VMDK files can be performed in the process of resizing such partitions (e.g., the partition is sized such that it is aligned with 64 KB boundaries). In yet other embodiments, the management server 102 can operate without either the resize tool 132 or the alignment tool 134.

The management server 102 further includes a user interface 136 for displaying to, and/or receiving from, a user information relating to operation of the management server 102. In certain embodiments, the user interface 136 causes the display of one or more windows for obtaining user input and/or outputting status information with respect to the virtual environment, such as, for example, storage quota requirements, a target size for one or more partitions and/or VMDKs, a recommended address for one or more partitions, alignment preferences, performance reports, instructions for the optimization tool(s) 130, combinations of the same or the like.

In certain embodiments, the network 110 comprises a local area network (LAN) through with the management server 102 and the host server 104 communicate via at least a server message block (SMB) protocol, a secure shell (SSH) protocol and/or hypertext transfer protocol secure (HTTPS). In yet other embodiments, the network 110 can comprise one or more of the following communication means: internet, intranet, wide area network (WAN), public network, combinations of the same or the like. In addition, connectivity to the network 110 may be through, for example, remote modem, Ethernet, token ring, fiber distributed datalink interface (FDDI), asynchronous transfer mode (ATM), combinations of the same or the like.

Although the virtual computing system 100 has been shown and described with reference to particular configurations, it will be understood that other embodiments of the invention can include more or fewer components. For instance, the virtual computing system 100 can comprise hundreds of virtual machines executing on numerous host servers. Moreover, the optimization tools 130 on the management server 102 can comprise more or fewer tools than the resize tool 132 and the alignment tool 134.

Figure 2:
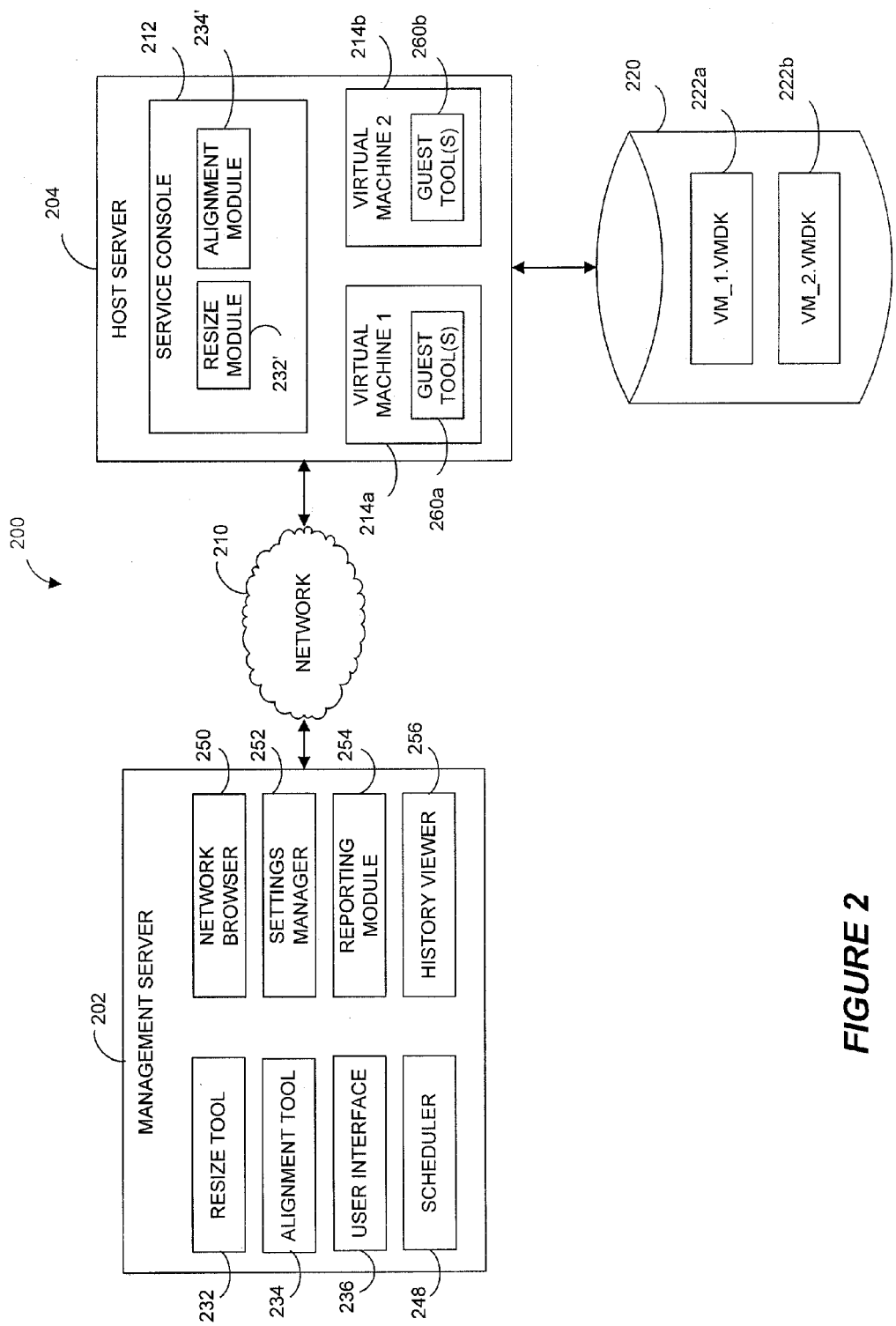
FIG. 2 illustrates a block diagram including further details of a management server in communication with a single host server, according to certain embodiments of the invention.

FIG. 2 illustrates a block diagram of a virtual computing system 200 including further details of a management server 202 in communication with a single host server 204, according to certain embodiments of the invention. As with the virtual computing system 100 of FIG. 1, the virtual computing system 200, in certain embodiments, is configured to address issues of virtual machine sprawl and/or growing enterprise storage costs by providing for storage reclamation and/or virtual machine optimization.

Moreover, it will be understood that certain components of the virtual computing system 200 are similar to those of the virtual computing system 100 of FIG. 1. Thus, for ease of description, features of such components will not be re-described in detail if they were described previously. Rather, the components in the embodiments of FIG. 2 will be given a reference numeral that retains the same last two digits as the reference numeral used in the embodiment of FIG. 1, and the last two digits will be preceded with a numeral "2." Thus, the management server 202 generally corresponds to the management server 102 with certain differences that will be illuminated in the following discussion.

As shown, the management server 202 communicates with the host server 204 over a network 210. The host server 204 further includes a host operating system, or service console 212, and two virtual machines executing outside the service console 212: virtual machine 1 214a and virtual machine 2 214b. The host server 204 further communicates with a datastore 220, which houses the VMDKs of the virtual machines 214a, 214b (i.e., VM1_.VMDK 222a and VM2.VMDK 222b).

In certain embodiments, the service console 212 of the host server 204 can be configured to provide a boot layer for the hypervisor(s) of the individual virtual machines 214a, 214b and is configured to start up and/or administer each of the virtual machines. In certain embodiments, the service console 212 can be advantageously accessed locally and/or remotely (e.g., via the management server 202), such as via SSH, Telnet, or other suitable network protocol usable for remote communications. In certain examples, the service console 212 can be further managed by a user via a command line interface. In embodiments of the invention in which the host server 204 comprises an ESX server, the service console 212 can comprise a VMWARE LINUX-based service console.

The management server 202 further comprises a plurality of components for assisting in the optimization of the virtual computing system 200. For instance, one or more of the following components can be programmed in the C# language or the like to execute on the management server 202.

As shown, the management server 202 comprises a resize tool 232, an alignment tool 234 and a user interface 236, which have been discussed above with respect to FIG. 1. In certain embodiments, the management server 202 is configured to inject the resize tool 232 and/or alignment tool 234 for execution within the service console 212 of the host server 204. For instance, the management server 202 can be configured to inject all or a portion of the resize tool 232 to execute as a resize module 232' within the service console 212. The management server 202 can also be configured to inject all or a portion of the alignment tool 234 to execute as an alignment module 234' within the service console 212. In yet other embodiments, the resize module 232' and/or alignment module 234' exist as installed and/or persistent modules on the host server 204.

In such embodiments of the invention, injection of these processes allows for remotely managing the optimization of the virtual machine(s) 214a and 214b. Moreover, because such components can be selectively and dynamically injected and later removed from the service console 212, the optimization components need not be persistently installed on the host server 204, thereby conserving host processing and memory resources. Additional details regarding employing one or more processes through injection to a host server are discussed in U.S. patent application Ser. No. 12/566,231, entitled "Systems and Methods for Data Management in a Virtual Computing Environment," filed on Sep. 24, 2009, which is hereby incorporated herein by reference in its entirety and is to be considered part of this specification.

Also, as discussed above with respect to the FIG. 1, the resize tool 232 and alignment tool 234 can be integrated or combined into a single module or tool. Likewise, the resize module 232' and the alignment module 234' on the host server 204 can be integrated or combined into a single module or tool. In yet other embodiments, the management server 202 can operate without either the resize tool 232 or the alignment tool 234, and/or the host server 204 can operate without either the resize tool module 232' or the alignment module 234'.

The illustrated management server 202 further comprises a scheduler 248, a network browser 250, a settings manager 252, a reporting module 254 and a history viewer 256. In certain embodiments, the scheduler 248 is programmed to begin one or more optimization processes at a specified time on a local or remote system. For instance, the scheduler 248 can determine if the host server 204 is available and then cause to be injected into the service console 212 via SSH the resize tool 232 and/or alignment tool 234 as described above. The scheduler 248 can also show, such a through the user interface 236, the currently scheduled tasks of the management server 202.

The network browser 250 can facilitate the locating of virtual machines within the virtual computing system 200. For example, the network browser 250 can display folder names and symbolic links to virtual machines that reside on the host server 204 and/or other host servers.

The settings manager 252, in certain embodiments, allows a user to maintain a set of optimization profiles for the virtual machine(s) of the virtual computing environment 200. For example, the profiles can comprise operating system-independent and/or -dependent rules that relate to virtual machine optimization. For example, such rules may relate to how much free disk space each virtual machine or VMDK partition should be allotted. In certain embodiments, the user can select a predefined optimization profile or create a new profile to be attached to selected virtual machine(s), such as by dragging within the network browser 250 icon(s) that represent the virtual machine(s) to be associated with the selected or new optimization profile.

The reporting module 254 can advantageously generate reports, specifications, statistics, projections, alerts or the like, regarding the optimization history and/or future of a given virtual machine. For instance, FIG. 9, as discussed in more detail below, provides an example of a statistics report that can be generated by the reporting module 254.

The history viewer 256 can produce historic information regarding the optimization of a particular virtual machine. For example, the history viewer 256 can access one or more description files of the virtual machine to display details about the state, or past state(s), of the virtual machine.

Although the management server 202 has been described with reference to a particular configuration, other embodiments of the invention can utilize a management server having more or fewer components than those discussed.

With continued reference to FIG. 2, virtual machines 214a and 214b further include, respectively, guest tools 260a and 260b. In certain embodiments, the guest tools 260a, 260b comprise tools that allow for communication with and/or within the particular virtual machine. For instance, in certain embodiments, the guest tools 214a, 214b comprise VMWARE TOOLS, commercially available from VMware, Inc. For example, such guest tools 214a, 214b can provide for communication with the management server 202 via remote procedure calls (RPCs) or the like.

In certain embodiments, the management server 202 communicates with the datastore 220 through the host server 204. For instance, the management server 202 can utilize one or more network virtual disk drivers for accessing the VM1_.VMDK 222a and VM2.VMDK 222b via, for example, simple file transfer protocol (FTP), secure file transfer protocol (SFTP) or the like.

Figure 3A:
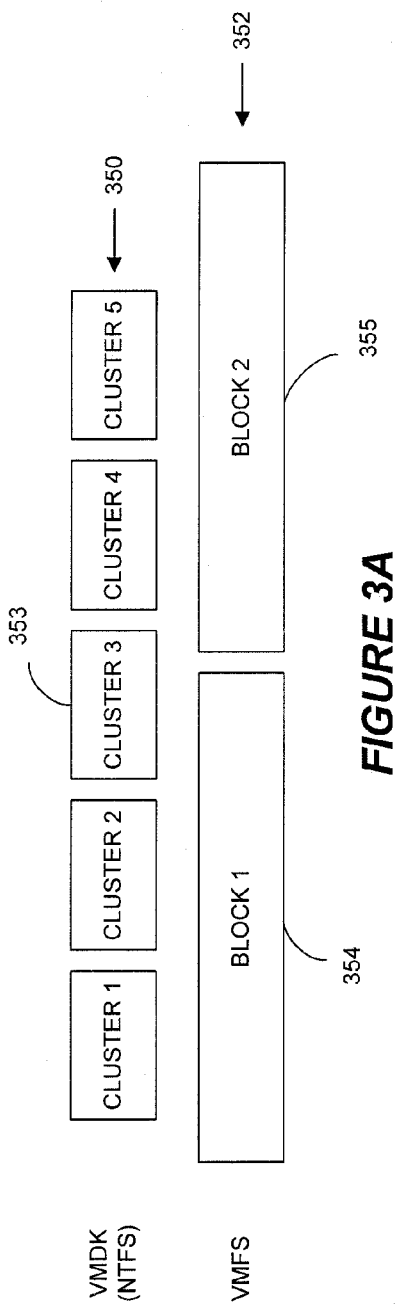
FIGS. 3A and 3B illustrate a comparison between an unaligned VMDK partition and an aligned VMDK partition.
Figure 3B:
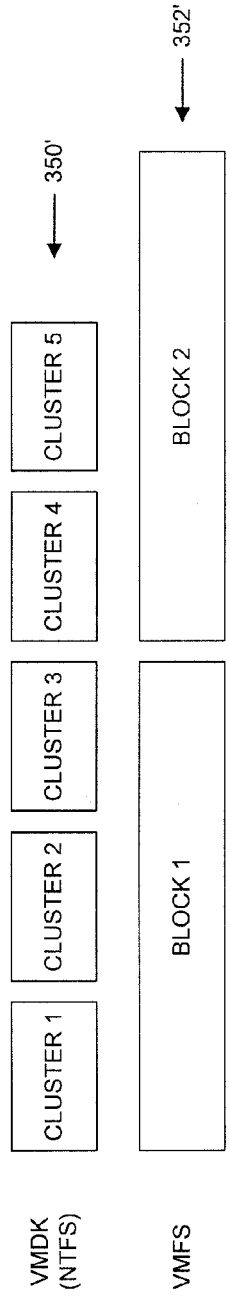

As discussed, the management server 202 is advantageously configured to optimize one or more of the virtual machines 214a, 214b via storage reclamation, partition re-alignment and/or the like, in order to improve the use of system resources. For instance, FIGS. 3A and 3B illustrate a simplified comparison between an unaligned partition and an aligned partition within a virtual infrastructure. In particular, FIG. 3A illustrates a VMDK file with a plurality of clusters 350 formatted in NTFS that are stored among multiple blocks 352 of a VMFS volume. As can be seen, the clusters 350 are misaligned with respect to the VMFS blocks 352. Thus, when an attempt is made to read cluster 3 353 of the VMDK file, both blocks 354 and 355 of the VMFS volume must be accessed, thereby resulting in excess I/O and additional consumption of processing resources.

FIG. 3B illustrates the same VMDK file following the partition alignment methods executable by embodiments of the invention. In particular, the clusters 350' of the VMDK file are aligned with the blocks 352' of the VMFS volume. Thus, when a read request is made with respect to any of the VMDK file clusters 350', only one of the VMFS blocks 352' is required to be accessed.

Figure 4:
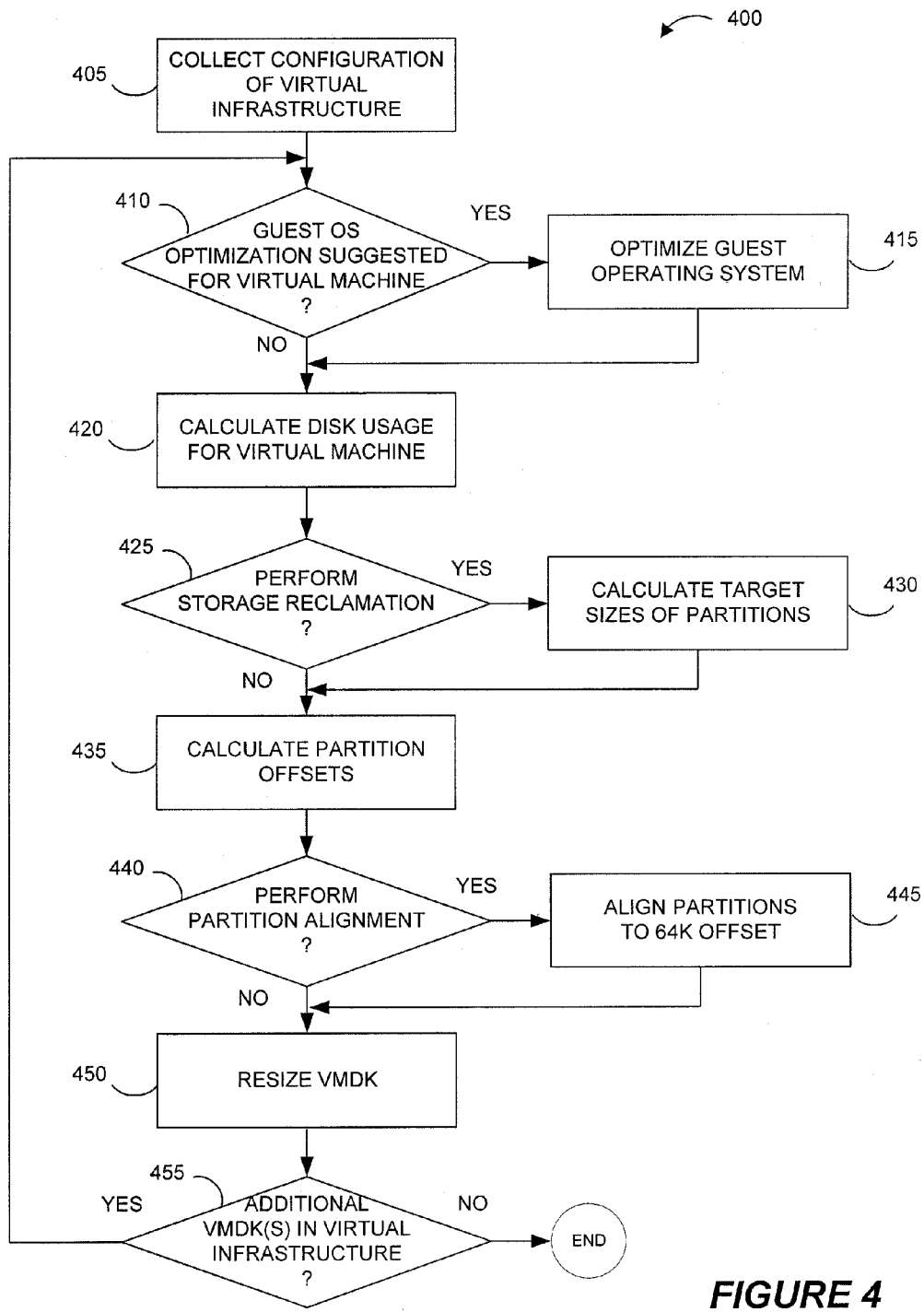
FIG. 4 illustrates a flowchart of an exemplary optimization process usable in the virtual computing systems of FIGS. 1 and 2.

FIG. 4 illustrates a flowchart of an exemplary process 400 for optimizing one or more virtual machines. For example, the optimization process 400 can be used by the virtual computing systems of FIGS. 1 and 2 to optimize virtual machine(s) contained therein by performing operating system optimization, storage reclamation and/or partition alignment. For exemplary purposes, the process 400 will be described with reference to the components of the virtual computing system 200 of FIG. 2.

The optimization process 400 begins with Block 405, wherein configuration information is collected regarding the virtual computing system 200. In certain embodiments, the management server 202 can communicate with the host server 204, the virtual machines 214a, 214b, a centralized virtual infrastructure management component (e.g., VMWARE VIRTUAL CENTER or vCENTER SERVER), combinations of the same or the like, to acquire certain system information such as, for example: number of host servers, number and/or current locations (e.g., paths) of virtual machines, virtual machine name, VMFS size, storage media type, used and/or free space of a particular virtual machine, guest operating system type, which virtual machines are powered on/off, internet protocol (IP) addresses of the virtual machines, whether or not a virtual machine comprises snapshots, usage history of virtual machine components/processes, a list of VMDKs attached to specific virtual machine(s), sizes and/or locations of VMDKs on the datastore 220, combinations of the same or the like.

In certain embodiments, the management server 202 acquires the initial data through one or more application programming interfaces (APIs), such as a VMware API, via HTTPS communications or the like, with each host server. The management server 202 can also acquire information directly from the virtual machines 214a, 214b through, for example, the guest tool(s) 260a, 260b.

Once the initial configuration information is collected, the process 400 determines if system optimization of a particular virtual machine is suggested and/or needed (Block 410). For instance, the process 400 can access the settings manager 252 to determine if the user has selected an option to optimize the guest operating system(s) of the virtual machines 214a, 214b.

If such system optimization is suggested, the process 400 moves to Block 415 to optimize the operating system of the particular virtual machine. In certain embodiments, the optimization can include, for example: excluding non-used and/or rarely used system components from the virtual machine's disk image, shutting down non-used services, cleaning temporary folders, modifying the system registry, clearing the system file cache, removing unnecessary log files, removing system auto recover files, clearing local profiles, running disk defragmentation, removing junk files, removing unnecessary installer folders, clearing the recycle bin, combinations of the same or the like.

Following system optimization and/or if system optimization is not needed or suggested, the optimization process 400 calculates the disk usage for the virtual machine (Block 420). In certain embodiments, the process 400 determines both the total disk size of the VMDK and the actual disk space being used by the virtual machine. Such information may be acquired, for example, during the initial gathering of the system configuration information of Block 405.

At Block 425, the process 400 determines if storage reclamation is needed and/or suggested. If so, the process 400 calculates a target or recommended size for each of the partitions of the VMDK (Block 430). For instance, in certain embodiments, the process 400 can access one or more optimization profiles or rules of the settings manager 252 to determine a recommended or selected free-to-used space ratio for the partitions and/or VMDK. As discussed above, this ratio can be operating-system dependent and/or can be calculated based on a projected growth of the virtual machine, the number of virtual machines executing on a particular host server, or the like.

At Block 435, the process 400 calculates the partition offsets of the VMDK. For instance, in certain embodiments, the alignment tool 234 can utilize WINDOWS management instrumentation (WMI) to perform an alignment scan of a WINDOWS-based virtual machine to collect volume offset and alignment information. In yet other embodiments, such information can be collected during the initial information collection phase of Block 405.

Based on the offsets, the process 400 can determine if the partitions of the VMDK are appropriately aligned with the underlying VMFS blocks, an example of which is illustrated in FIG. 3B. If at Block 440 the process 400 determines that alignment is needed, the alignment tool 234 and/or alignment module 234' aligns and/or determines the appropriate offsets for the partitions of the VMDK file. In certain embodiments, the alignment tool 234 aligns each of the partitions of the VMDK on 64 KB boundaries of the datastore 220. For instance, the process 400 can change a WINDOWS volume of the virtual machine to use 64 KB blocks, which blocks are then aligned with the VMFS. Additional details with respect to this process are described below with reference to FIG. 6B.

At Block 450, the process 400 performs a resize of the VMDK. In certain embodiments, Block 450 comprises the actual resizing and/or aligning of one or more partitions within the VMDK. Based on such resizing and/or moving of the partitions, the entire VMDK is resized. In certain embodiments, as discussed in more detail with respect to FIGS. 6A and 6B, the resizing process is advantageously performed without the creation of a new VMDK and/or the copying of contents from the current VMDK another VMDK. Rather, moving the partitions is accomplished by copying a sequence of sectors of the partitions to new locations on the disk.

In certain embodiments wherein the VMDK is truncated, following the aligning and/or resizing of the partitions, Block 450 can further comprise updating each partition's BIOS parameter blocks (BPBs) for NTFS partitions and/or the cylinder(s)-head(s)-sector(s) (CHS) in the MBR to correspond to the new VMDK geometry. For instance, for each partition, the process 400 can calculate a new CHS address for the partition based on the partition's logical block addressing (LBA) address and current disk geometry and write the new CHS address to the MBR for a primary partition or an EBR for logical disks.

At Block 455, the process 400 determines if there are additional VMDKs within the virtual computing system 200 that need to be optimized. If so, the process 400 repeats Blocks 410 through 450 for each VMDK. If all the VMDKs have been addressed, the process 400 terminates.

Although the process 400 has been described with reference to a particular configuration, other embodiments of the process 400 can be used in virtual machine optimization. For instance, the process 400 can resize a partition prior to alignment, and/or the process 400 can skip one or more of the system optimization, alignment and resizing routines. In yet other embodiments, wherein one or more virtual machines comprises a LINUX operating system, the process 400 can configure the virtual machine(s) to boot from an ISO image that includes tools for resizing and/or aligning VMDK data. Following the resizing and alignment of the VMDK, the virtual machine(s) are then booted using their guest operating systems.

Moreover, in certain embodiments, the process 400 can perform at least one of resizing and aligning partitions. In yet other embodiments, the resizing process includes alignment of VMDK partitions such that the process 400 takes into account 64 KB boundary alignment when resizing each partition. In yet further embodiments of the invention, the process 400 does not include a system optimization option (Blocks 410 and 415).

Figure 5A:
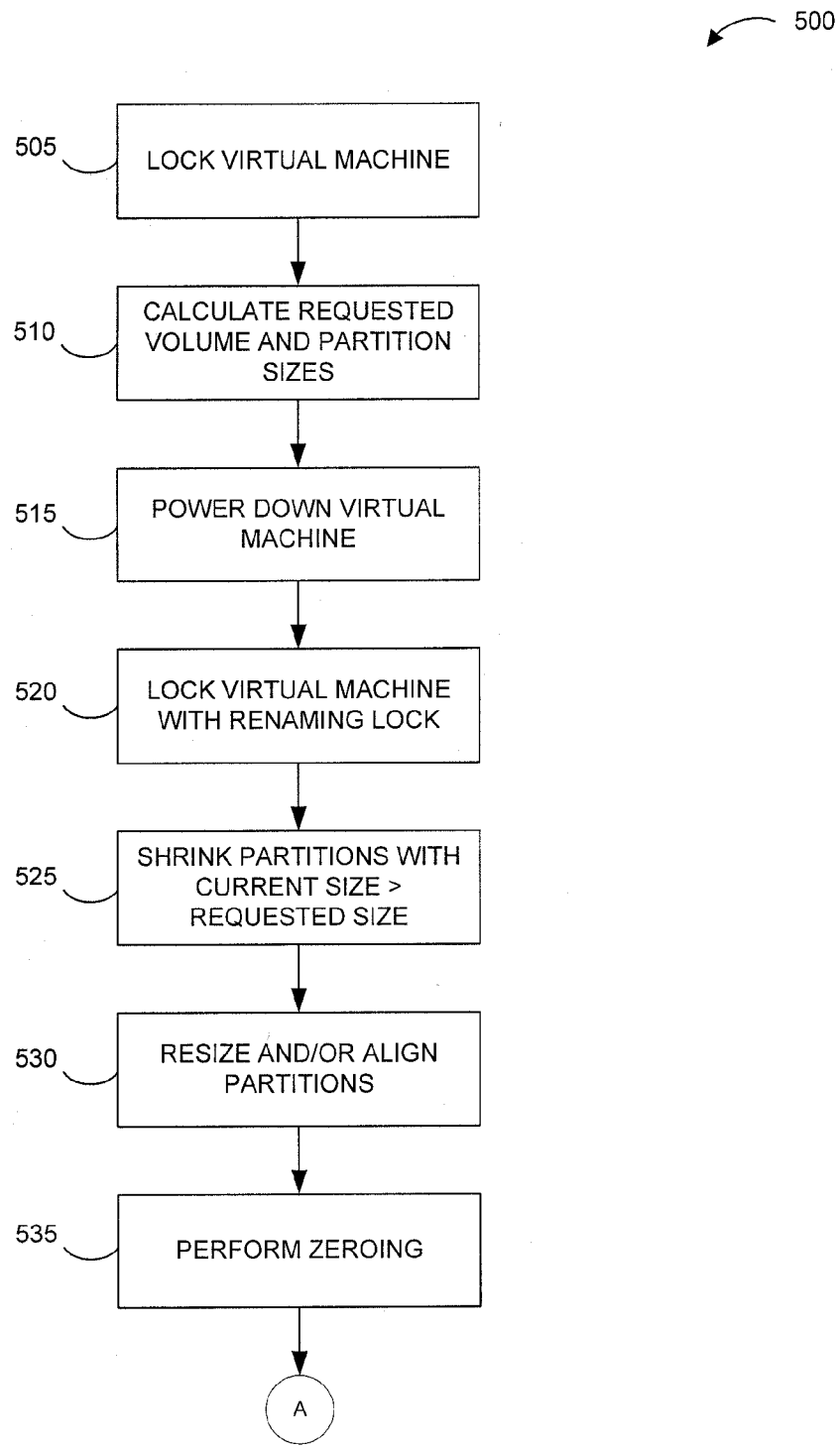
FIGS. 5A and 5B illustrate a flowchart of an exemplary virtual machine optimization process for the virtual computing systems of FIGS. 1 and 2.
Figure 5B:
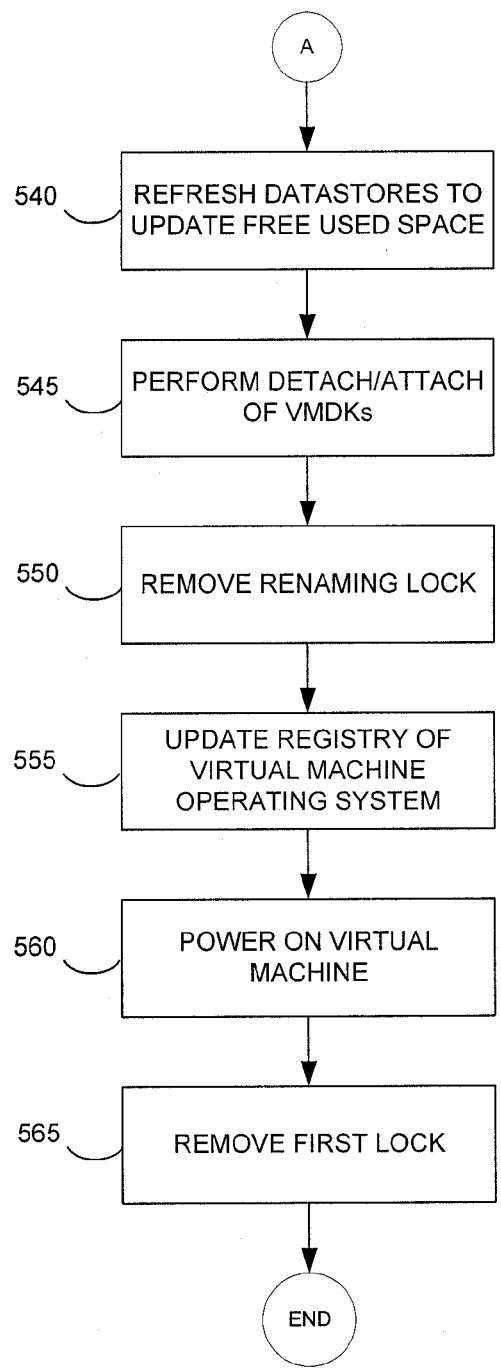

FIGS. 5A and 5B illustrate a flowchart of additional details of a virtual machine optimization process 500, according to certain embodiments of the invention. In certain embodiments, the optimization process 500 corresponds generally to Blocks 420 to 450 of the optimization process 400 of FIG. 4 and can be used to reclaim and/or reallocate storage of a VMDK file. For exemplary purposes, the optimization process 500 will be described with reference to the components of the virtual computing system 200 of FIG. 2 having a WINDOWS-based virtual machine, wherein the management server 202 and/or host server 204 can execute one or more of the illustrated blocks.

At Block 505, the management server 202 locks a virtual machine to prevent access by another user or application. The process 500 then calculates requested or suggested volume and partition sizes of the associated VMDK file using corresponding quotas (Block 510). For instance, the quotas can be based on one or more user preferences, customizable profiles, predetermined rules or policies, or the like, that specify preferred storage and/or alignment requirements. In certain embodiments, such calculations are also based at least in part on configuration information gathered regarding the virtual machine, VMDK and/or virtual infrastructure (see, e.g., Block 405 of FIG. 4).

At Block 515, the process 500 powers down the virtual machine. In certain embodiments, the management server 202 and/or resize tool 232 instructs the service console 212 of the host server 204 to shut down the virtual machine. Although the virtual machine is powered down, the process 500 can still access the associated VMDK via a specified path to the VMDK files (e.g., gathered during Block 405 of the process 400).

After the virtual machine has been powered down, the process 500 obtains a second lock on the virtual machine (Block 520). In certain embodiments, the second lock comprises a renaming lock to prevent a second user or administrator from powering on the virtual machine during the optimization process 500. For instance, obtaining the second lock may comprise temporarily renaming the VMDK file for a period of time until the optimization process 500 has completed. In yet other embodiments of the invention, Block 520 is optional and the process 500 can proceed without obtaining a second lock on the virtual machine.

At Block 525, the process 500 performs a shrink operation on one or more VMDKs. In certain embodiments, the shrink operation comprises the management server 202 utilizing a tool or command to shrink or truncate partitions whose current size exceeds the requested size. Moreover, such shrinking can advantageously be performed without adjusting the current start offset of the partition. For instance, the management server 202 can utilize the resize tool 232 and/or resize module 232' to shrink the partitions that have a size greater than a requested or recommended size. In certain embodiments, following said shrinking, each of the VMDKs involved in the optimization process 500 is sorted in order of the VMDK with the greatest potential change in size to the VMDK with the least potential change in size, or vice-versa, to facilitate the subsequent optimization steps.

At Block 530, the process 500 resizes and/or aligns each of the partitions of the VMDK(s). For example, the resize tool 232, resize module 232', alignment tool 234 and/or alignment module 234' can perform the resizing and/or aligning processes, as described in more detail with respect to FIGS. 6A and 6B.

The process 500 continues with Block 535 to perform zeroing of the VMDK(s). In certain embodiments, the management server 202 causes unused parts of the VMDK to be filled with zeroes. For instance, the resize module 232' can be configured to "wipe" partitions or extents (e.g., non-system extents) and/or unallocated space between extents.

In embodiments of the invention utilizing NTFS partitions, the resize module 232' can retrieve a map of used clusters using, for example, libntfs (ntfsresize). The resize module 232' can then calculate blocks that have only unused clusters. For every such block that contains any data except for zeroes, the resize module 232' can write zeroes to the block. For unallocated space between extents, the process 500 can include calculating the blocks between the extents, reading such blocks, and writing zeroes to any blocks having non-zero data.

For other types of partitions (e.g., Ext 2/3/4 partitions) the wipe routine can be performed using external tools or skipped entirely. In yet other embodiments, the process 500 can be performed without Block 535.

Continuing with Block 540, the process 500 refreshes the datastore(s) to update the free used space. In certain embodiments, this block is performed using the VimAPI available from VMware, Inc. At Block 545, the process 500 detaches and then re-attaches each VMDK disk to the corresponding virtual machine to cause the host server 202 to update the new sizes of the VMDKs.

Next, the process 500 removes the second lock (Block 550), such as by renaming the virtual machine to its original name, and updates the registry of the operating system of the virtual machine (Block 555). For instance, updating the registry can comprise restoring volume mount points, fixing values to prevent rebooting following the optimization process 500, fixing new volume offsets in the boot configuration, combinations of the same or the like.

At Block 560, the process powers on the virtual machine, and the first lock on the virtual machine is removed (Block 565).

Although the optimization process 500 was been generally described with reference to particular configurations (e.g., a WINDOWS-based virtual machine), other embodiments of the invention can include more or fewer blocks than those illustrated in FIGS. 5A and 5B. For instance, in a virtual computing system comprising a LINUX-based virtual machine, the process 500 can include configuring the virtual machine to boot from an ISO image by attaching the ISO image to the virtual machine, attaching a FLP image to the virtual machine, and installing a boot loader into the virtual machine disks. In this manner, the shrink step of Block 525 can be performed by booting the virtual machine from the ISO image and, for each Ext 2/3/4 volume on the virtual machine that must be truncated, shrinking the file system using the resize2fs program.

Figure 6A:
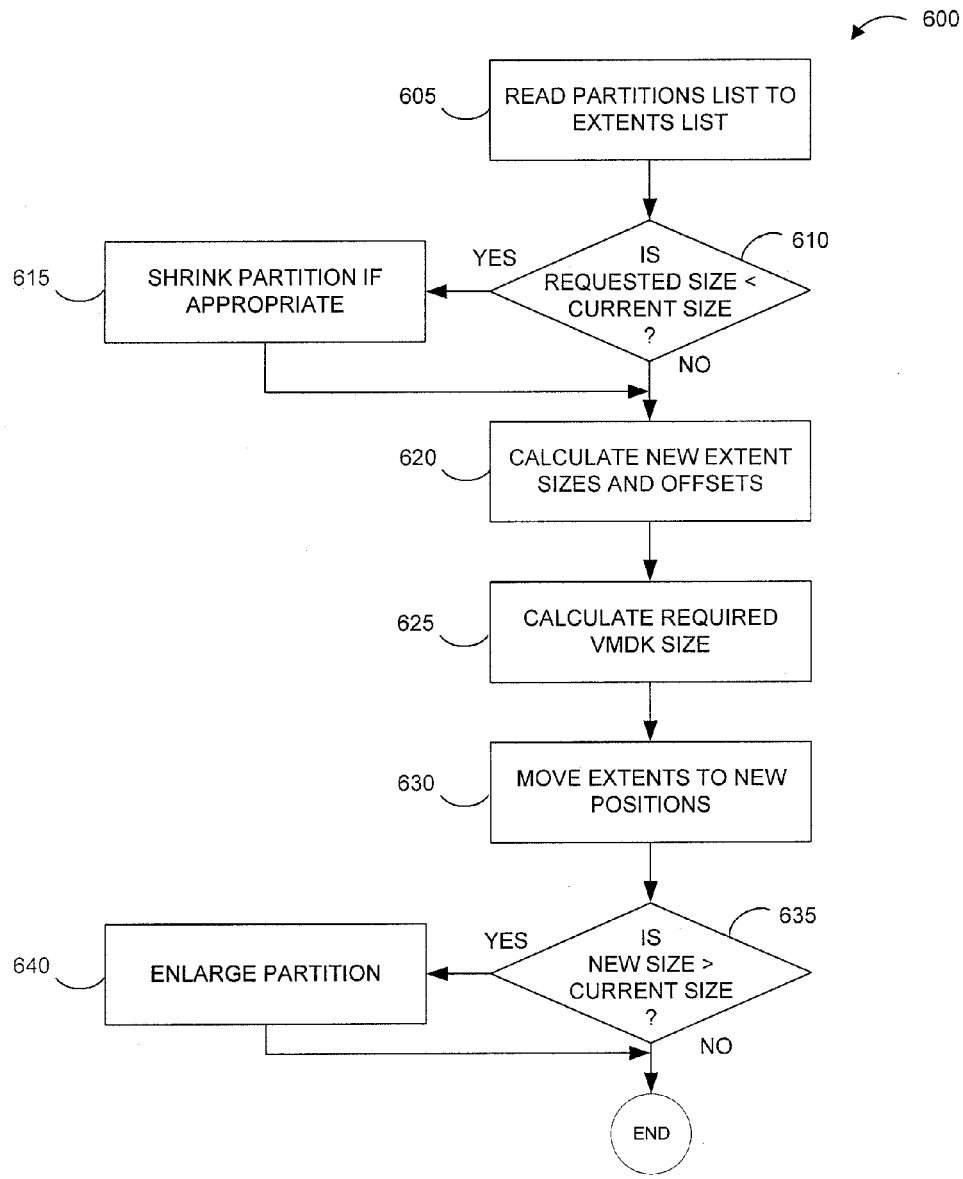
FIG. 6A illustrates a flowchart of an exemplary virtual machine disk resize process for the virtual computing systems of FIGS. 1 and 2.

FIG. 6A illustrates a flowchart of an exemplary VMDK resize process 600, according to certain embodiments of the invention. In certain embodiments, the resize process 600 corresponds generally to Blocks 525 and 530 of the optimization process 500 of FIG. 5A to resize and/or align partitions, or extents, of a VMDK. In certain embodiments, blocks of the resize process 600 are performed by the resize module 232' and/or alignment module 234' within the service console 212 of the host server 204.

At Block 605, the process 600 begins by reading a list of the VMDK partitions list to a list of extents. For each partition within the extents list, the process 600 determines if the current size of the partition is greater or equal to a requested size (Block 610). For example, the requested size of the partition can be based at least in part on a user preference, a quota requirement, a predetermined policy or the like.

For each partition having a requested or recommended size that is less than its current size, the process 600 at Block 615 shrinks the partition, if appropriate. For example, in certain embodiments, the process 600 shrinks the file system on the partition and shrinks the partition down to the file system size. For instance, for an NTFS file system, the shrink operation can be performed using libntfs (ntfsresize). For Ext 2/3/4 file systems, the file systems can be shrunk using commercially available external tools.

After shrinking the partitions or if the current size of each partition is not greater than the requested size, the process 600 proceeds with Block 620 to determine new extent sizes and offsets based on the requested sizes and offsets, which determination is described in more detail below with respect to FIG. 6B.

The process 600 then calculates the required VMDK size based at least on the new size and/or offset of the last partition of the VMDK (Block 625). In certain embodiments, the required VMDK size is calculated using algorithms provided in the VMWARE disk specification.

At Block 630, the process 600 moves each of the extents to their newly determined positions. In certain embodiments, each of the extents is processed in order of their start offsets according to the following recursive steps. First, if the current offset of the extent is greater than the new calculated offset for the extent, the extent or partition is moved to the left by copying a sequence of sectors. This copying is accomplished by decreasing the addresses of the sectors on the disk. The process 600 then continues with the next partition.

On the other hand, if the current offset of the extent is less than the new offset, the process 600 moves to the next partition. If the current extent is the final partition on the disk, the partition is moved to the right by copying a sequence of sectors. This copying is accomplished by increasing the addresses of the sectors on the disk.

At Block 635, the process 600 determines if the new size of each partition is greater than its current size. If so, at Block 640, the process 600 enlarges the partition up to the new file system size and enlarges the file system on the partition. In certain embodiments of the invention having an NTFS file system, enlarging the partition is performed by using libntfs (ntfsresize). For embodiments having Ext 2/3/4 file systems, such enlarging can be performed using commercially available external tools.

Figure 6B:
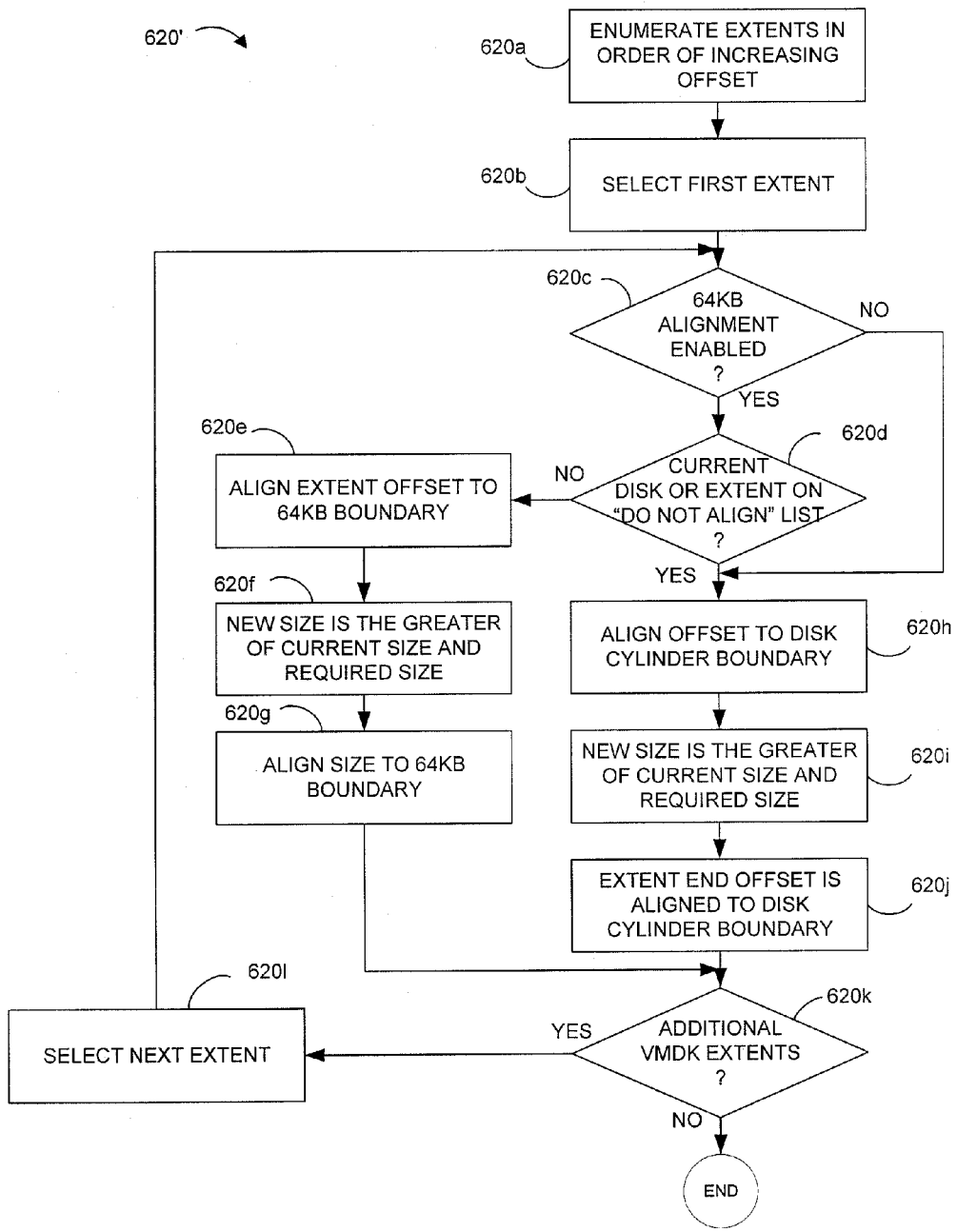
FIG. 6B illustrates a flowchart of an exemplary partition size calculation sub-process usable in the resize process of FIG. 6A.

FIG. 6B illustrates a flowchart of an exemplary partition size calculation sub-process 620' usable in the resize process 600 of FIG. 6B, according to certain embodiments of the invention. In certain embodiments, the partition size calculation sub-process 620' corresponds generally to Block 620 of the resize process 600 to calculate new extent sizes and offsets based on requested and current sizes. In certain embodiments, blocks of the partition size calculation sub-process 620' are performed by the resize module 232' and/or alignment module 234' within the service console 212 of the host server 204.

The sub-process 620' begins at Block 620*a* wherein each of the extents of the VMDK are ordered based on their starting offsets. Beginning with the first extent (Block 620*b*), the process 620' determines if 64 KB alignment is enabled (Block 620*c*). For example, 64 KB alignment can be based on a user-selectable option to perform alignment of the VMDK partitions to 64 KB boundaries. In yet other embodiments, the 64 KB alignment option can be automatically enabled for all resize processes.

If 64 KB alignment is enabled, the process 620' also determines if the current VMDK and/or extent is on a "Do Not Align" list (Block 620*d*). For instance, in certain embodiments of the invention, particular extents or partitions can be designated by the user, resize module 232' or alignment module 234' as not requiring alignment.

If the disk and/or extent is not on the list, the process 620' proceeds with Block 620*e* to align the extent offset to the next 64 KB boundary (e.g., by rounding up) to correlate with the VMFS. At Block 620*f,* the new size of the extent is set to the greater of the current size of the extent and the required size. For instance, if the requested size of a partition is less than the original size of the partition, the partition may have already been resized to its closest possible value during a previous shrinking process (see, e.g., Block 525 of FIG. 5A).

At Block 620g, the new extent size is then aligned, or increased, such that the extent end offset is aligned with the next 64 KB boundary (e.g., by rounding up). This advantageously allows for the next extent of the VMDK to also begin at the 64 KB boundary. The process 620' then continues to Block 620k to determine if there are additional extents associated with the VMDK.

However, if 64 KB alignment is not enabled (Block 620c) or the disk and/or current extent is identified as one not to be aligned (Block 620d), the process 620' proceeds with Block 620h, wherein the offset of the extent is aligned to the disk cylinder boundary. At Block 620i, the new size of the extent is then set to be the greater of the current size of the extent and the required size. Following this block, the extend end offset is aligned to the disk cylinder boundary (Block 620j), thereby resulting in an extent size being equal to the difference between the end offset and the start offset.

Moving to Block 620k, if there are additional VMDK extents, the process 620' selects the next extent (Block 620l) and returns to Block 620c. If there are no additional VMDK extents, the process 620' terminates.

Figure 8:
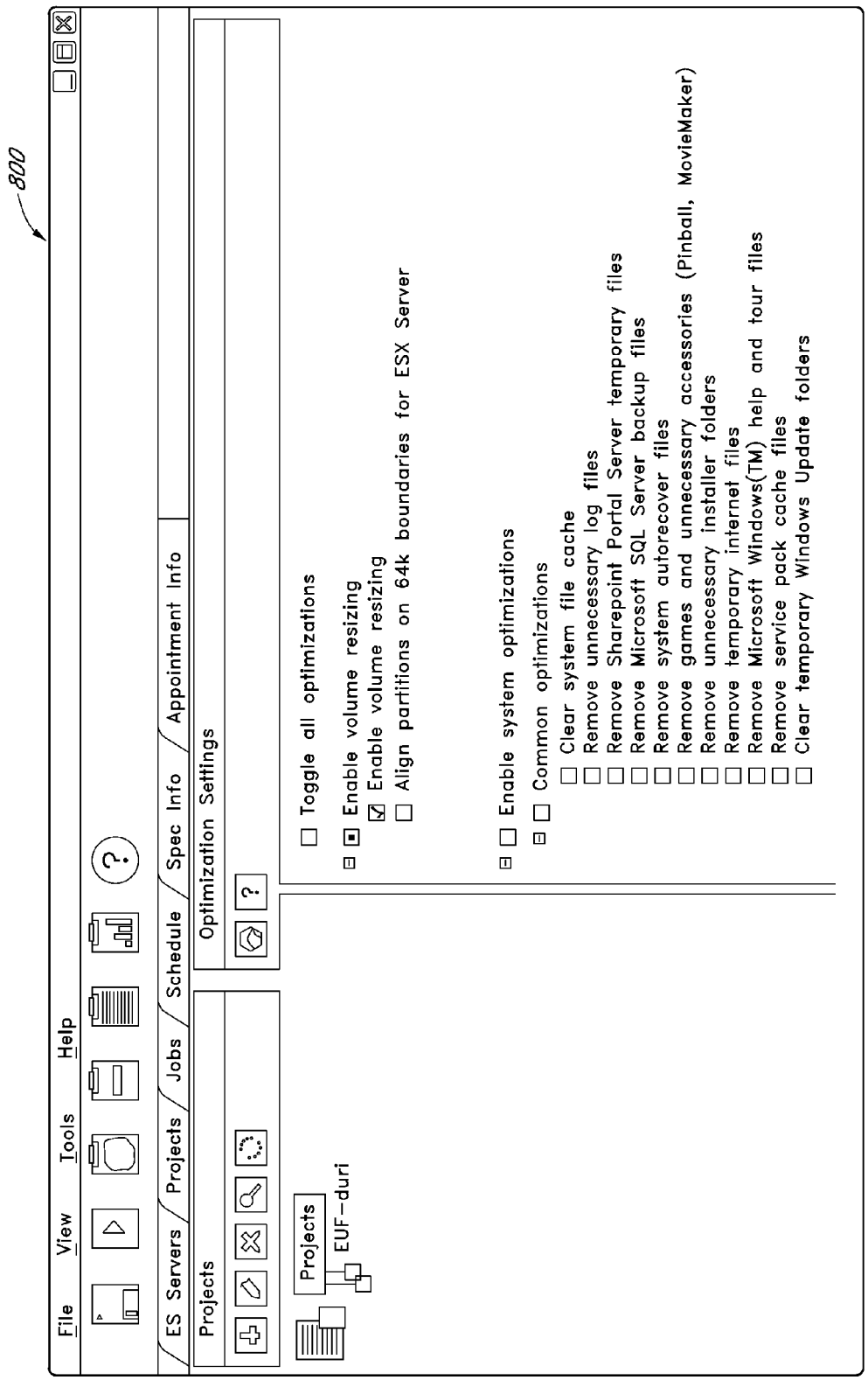
FIG. 8 illustrates an exemplary screen display of a project optimization settings window, according to certain embodiments of the invention.
Figure 9:
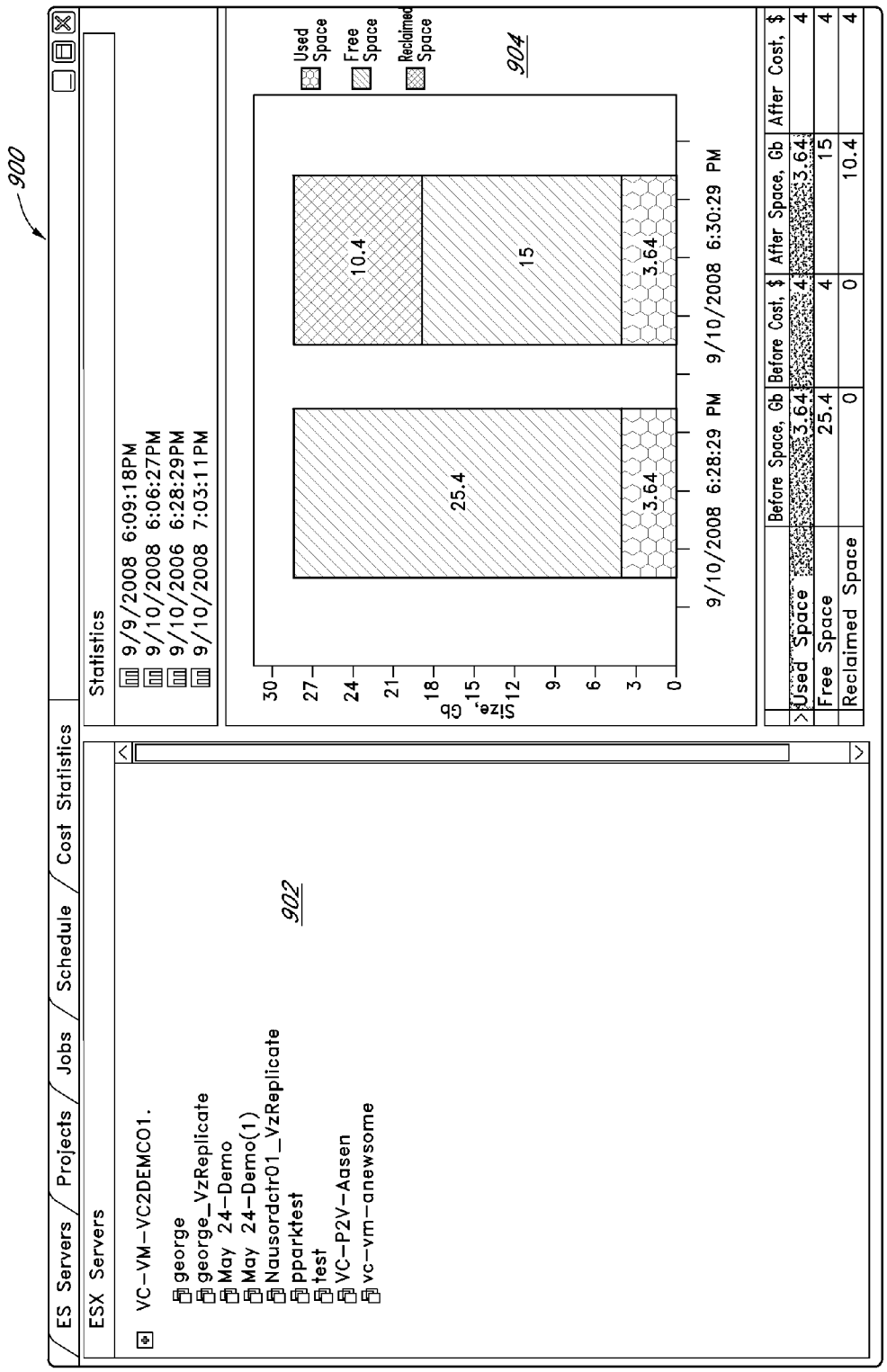
FIG. 9 illustrates an exemplary screen display of a cost statistics window, according to certain embodiments of the invention.

FIGS. 7-9 provide exemplary screen displays that can be used with embodiments of the invention to plan, execute and/or review optimization of one or more virtual machines. In certain embodiments, one or more of the screen displays can be provided to the user via the interface 236 of the management server 202. It should also be understood that the depicted screen displays are for exemplary purposes and are not intended to limit the scope of the disclosure.

FIG. 7 illustrates an exemplary screen display of a space and alignment report 700, according to certain embodiments of the invention. In particular, the report 700 includes specifications of a single ESX server comprising fifteen virtual machines. In certain embodiments, the report 700 allows the user to plan and/or configure optimization parameters for the host server and its virtual machine(s).

As shown, the report 700 comprises a virtual machine table listing information regarding each of the virtual machines on the particular host server. The virtual machine table includes, among other things, a virtual machine name column 702, a total disk space column 704, a used disk space column 706, a free disk space column 708, and a free disk space percentage column 710, each of which can be used to determine whether or not one or more of storage reclamation processes should be performed on one or more virtual machines.

Moreover, the virtual machine table further includes an alignment status column 712, which can inform the user whether or not an alignment scan should be performed and/or if one or more partitions of the VMDKs should be aligned.

The report 700 also includes a datastore table 714 comprising information regarding the datastore(s) in communication with the particular host server. As shown, the datastore table 714 identifies the storage characteristics of the datastores housing one or more of the VMDKs.

The report 700 further includes a projected savings table 716 that provides the user with space and cost savings that could potentially be achieved if storage reclamation were to be performed on particular virtual machines. In certain embodiments, the projected savings information is based on established free-to-used space rules and/or profiles maintained by the settings manager 252.

FIG. 8 illustrates an exemplary screen display of a project optimization settings window 800, according to certain embodiments of the invention. As shown, the window 800 provides a user with a plurality of options for optimizing one or more virtual machine(s). In certain embodiments, the user-selected settings are saved as a customized profile by the settings manager 252.

FIG. 9 illustrates an exemplary screen display of a cost statistics window 900, according to certain embodiments of the invention. As shown, the window 900 provides a user with a graphical depiction of space and cost savings associated with the storage reclamation of a particular virtual machine. In particular, the window 900 includes a list 902 of host servers and the associated virtual machines within the virtual computing system. Upon selection of a particular virtual machine and a specified date/time, a data viewer section 904 shows space and/or cost information in both a chart and spreadsheet format.

In view of the foregoing, the disclosed systems and methods can provide various advantages in a virtual computing system. In particular, certain embodiments of the invention can provide for one or more of the following functions, features and/or benefits:

1. Reclaim space on an ESX datastore by automating the periodic resizing of NTFS partitions of WINDOWS-based virtual machines;
2. Reduce the footprint of WINDOWS by enabling the periodic deletion of selected files and disabling services;
3. Reduce time required for deploying, backing up and/or recovering virtual machine image files;
4. Assist in improving the performance of running virtual machines;
5. Increase free space where needed;
6. Help organizations improve productivity and cost efficiencies with virtual machines;
7. Recover costly enterprise storage by optimization of virtual machines running on ESX servers;
8. Improve utilization and control of hardware resources;
9. Increase in virtual machine-to-host ratio;
10. Faster backup and recovery with smaller archives;
11. Improve performance of virtual machines running on ESX servers;
12. Allocate additional virtual machines on an existing SAN. For example, to avoid purchasing another SAN, a user can use an embodiment of the invention to perform storage reclamation and allow for allocation of additional virtual machines on the existing SAN; and
13. Use with project-based reclamation in which a virtual machine created based on an original template can be resized up or down during the storage reclamation process.

Furthermore, in certain embodiments, the systems and methods described herein can advantageously be implemented using computer software, hardware, firmware, or any combination of software, hardware and firmware. In certain embodiments, systems are implemented as a number of software modules that comprise computer executable code for performing the functions described herein. In certain embodiments, the computer-executable code is executed on one or more general purpose computers. However, a skilled artisan will appreciate, in light of this disclosure, that any module that can be implemented using software to be executed on a general purpose computer can also be implemented using a different combination of hardware, software or firmware. For example, such a module can be implemented completely in hardware using a combination of integrated circuits. Alternatively or additionally, such a module can be implemented completely or partially using specialized computers designed to perform the particular functions described herein rather than by general purpose computers.

Moreover, certain embodiments of the invention are described with reference to methods, apparatus (systems) and computer program products that can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction means which implement the acts specified herein.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the acts specified herein.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for improving virtual machine performance within a computing environment, the method comprising:
   for each of a plurality of virtual machines executing on at least one host server:
      obtaining a lock on the virtual machine associated with a virtual machine disk having a plurality of partitions,
      determining a target size of one or more of the plurality of partitions of the virtual machine disk,
      issuing a first instruction to power off the virtual machine,
      while the virtual machine is powered off, performing at least one of resizing and aligning the one or more partitions without copying contents of the virtual machine disk to another virtual machine disk,
      issuing a second instruction to power on the virtual machine, and
      removing the lock from the virtual machine.

2. The method of claim 1, additionally comprising automatically resizing and aligning the one or more partitions of the virtual machine disk.

3. The method of claim 2, wherein said aligning comprises aligning a start offset of each of the one or more partitions with a 64 kilobyte boundary of a physical disk storing the virtual machine disk.

4. The method of claim 3, wherein said resizing comprises increasing a size of each of the one or more partitions such that an end offset of each of the one or more partitions aligns with another 64 KB boundary of the physical disk.

5. The method of claim 2, wherein said resizing comprises reducing a size of each of the one or more partitions to the target size.

6. The method of claim 1, wherein said performing at least one of resizing and aligning the one or more partitions comprises moving each of the one or more partitions by changing addresses of sectors of the one or more partitions.

7. The method of claim 1, additionally comprising receiving with a host operating system of each of the at least one host server a resize module from a remote management server to perform the at least one of resizing and aligning.

8. The method of claim 7, further comprising removing the resize module following said removing the lock from the virtual machine.

9. The method of claim 1, wherein said determining the target size comprises receiving user input indicative of at least one of a requested size and a new address for at least one of the one or more partitions.

10. The method of claim 1, additionally comprising:
   obtaining a second lock on the virtual machine following said issuing the first instruction to power off the virtual machine; and
   releasing the second lock following said performing at least one of resizing and aligning and prior to issuing the second instruction to power on the virtual machine.

11. The method of claim 10, wherein obtaining the second lock comprises renaming the virtual machine disk from a first name to a second name and said releasing the second lock comprises renaming the virtual machine disk with the first name.

12. The method of claim 1, additionally comprising, prior to said issuing the second instruction to power on the virtual machine:
   detaching the virtual machine disk from the virtual machine; and
   re-attaching the virtual machine disk to the virtual machine.

13. A system for improving virtual machine performance within a computing environment, the system comprising:
   a host server comprising a host operating system and a plurality of virtual machines each having a guest operating system;
   a datastore comprising a plurality of virtual machine disks associated with each of the plurality of virtual machines, wherein a first virtual machine disk of the plurality of virtual machine disks is associated with the first virtual machine of the plurality of virtual machines; and
   a management server in network communication with the host server, the management server being configured to inject a resize module into the host operating system of the host server, the resize module being further configured to:
      determine a target size of one or more of a plurality of partitions of the first virtual machine disk,
      issue a first instruction to power off the first virtual machine,
      while the first virtual machine is powered off, perform at least one of resizing and aligning the one or more partitions without copying contents of the first virtual machine disk to another virtual machine disk, and
      afterwards, issue a second instruction to power on the first virtual machine.

14. The system of claim 13, wherein the resize module is further configured to:
   determine a target size of one or more of a plurality of partitions of a second virtual machine disk of the plurality of virtual machine disks associated with the second virtual machine of the plurality of virtual machines;

issue a third instruction to power off the second virtual machine, while the second virtual machine is powered off, perform at least one of resizing and aligning the one or more partitions of the second virtual machine disk without copying contents of the second virtual machine disk to another virtual machine disk, and afterwards, issue a fourth instruction to power on the second virtual machine.

15. The system of claim 13, wherein the management server is further configured to remove the resize module following said issuing of the second instruction to power on the first virtual machine.

16. The system of claim 13, wherein the management server further comprises a user interface configured to receive user input indicative the target size of the one or more partitions of the first virtual machine disk.

17. The system of claim 13, wherein the resize module is further configured to automatically resize each of the one or more partitions such that both a beginning offset and an end offset of each of the one or more partitions is aligned with a 64 kilobyte boundary of the datastore.

18. A system for improving virtual machine performance within a computing environment, the system comprising:

means for obtaining a lock on a virtual machine associated with a virtual machine disk having a plurality of partitions;

means for determining a target size of one or more of the plurality of partitions of the virtual machine disk means for powering off the virtual machine;

means for automatically resizing and aligning the one or more partitions, while the virtual machine is powered off, without copying contents of the virtual machine disk to another virtual machine disk;

means for powering on the virtual machine following said performing; and means for removing the lock from the virtual machine.

* * * * *